United States Patent

[11] 3,621,920

| [72] | Inventor | William R. Brown<br>1415 Thompson Road, Woodburn, Oreg. 97071 |
|---|---|---|
| [21] | Appl. No. | 74,376 |
| [22] | Filed | Sept. 22, 1970 |
| [45] | Patented | Nov. 23, 1971 |

[54] LAWN-PERFORATING APPARATUS
6 Claims, 9 Drawing Figs.

[52] U.S. Cl. .................................................. 172/21,
172/43, 172/53, 172/75, 111/89
[51] Int. Cl. ...................................................... A01b 45/02
[50] Field of Search ............................................ 172/19–22,
40, 42, 43, 53, 61–62; 56/249; 111/89, 92;
173/22–24; 175/108

[56] References Cited
UNITED STATES PATENTS

| 2,638,831 | 5/1953 | Ferguson et al. | 172/22 |
| 3,015,364 | 2/1962 | Fitzgerald | 172/42 |
| 2,422,729 | 6/1947 | Helbig | 172/21 |
| 3,414,063 | 12/1968 | Kuhlman | 172/21 |
| 2,236,562 | 4/1941 | Brandes | 172/22 |
| 2,255,040 | 9/1941 | Helbig | 172/21 |
| 2,303,726 | 12/1942 | Dettloff et al. | 172/21 |
| 2,730,028 | 1/1956 | Oswalt | 172/21 |
| 2,838,986 | 6/1958 | Fessel | 172/116 |
| 2,918,130 | 12/1959 | Thom | 172/22 |
| 3,490,540 | 1/1970 | West et al. | 172/21 |
| 3,566,973 | 3/1971 | Blair et al. | 172/21 |

Primary Examiner—Robert E. Pulfrey
Assistant Examiner—C. W. Hanor
Attorney—Daniel P. Chernoff ABSTRACT: Lawn-aerating apparatus for punching a multiplicity of holes in terrain comprising an electric motor carried on a wheeled frame and coupled to a plurality of spiker rod elements. In a first embodiment the rotary drive cooperates with a cam mechanism, which is normally decoupled but which engages when pressure is applied against the tips of the spiker rod elements, to vertically reciprocate the rods at relatively high frequency so as to drive them into the ground. In a modified embodiment the spiking elements are in the form of augers which are coupled by a gear arrangement for common rotation by the motor so as to screw them into the ground. In both embodiments the wheels and frame are carried on a spring-biased suspension which assists in the in-and-out motion of the law perforator as it is rolled along the ground punching holes in the terrain.

3,621,920

LAWN-PERFORATING APPARATUS

BACKGROUND OF THE INVENTION

This invention relates to a lawn-perforating apparatus for forming a multiplicity of holes in terrain so as to improve the penetration of water or liquid fertilizer through the surface of the soil crust and to facilitate the breaking up of the soil or of any ice formed thereon. The apparatus is of simplified, lightweight, compact and inexpensive construction rendering it suitable for purchase and use by the homeowner who desires to aerate a relatively small parcel of land, although it will be understood that the novel features and principles herein disclosed are readily applicable to larger and more rugged lawn-perforating apparatus designed for use on golf courses, cemeteries and similar large expanses of lawn surface.

In many geographical areas, due to either local soil conditions or sparse rainfall during summertime, or a combination of both, the soil becomes dried out to such an extent that a hard, virtually impenetrable crust is formed which substantially impedes the passage of water and other nutrients to the underlying roots of the grass covering, causing the grass to dry up and die and creating the condition on the lawn surface known as "brown patch." In an effort to prevent this, it is common to aerate the soil by punching a plurality of holes into the ground spaced over the lawn surface through the use of a hand tool, such as a pitch fork, or by a lawn-perforating apparatus. Similarly, in wintertime, ice formed on sidewalks, roadways and the like can be broken up in similar fashion by perforating the ice layer.

Prior art devices have been designed in the form of powered lawn- or turf-perforating machines for the aforementioned purposes, examples of which are shown in Rose, U.S. Pat. No. 2,206,264; Helbig, U.S. Pat. No. 2,255,040; Oswalt, U.S. Pat. No. 2,728,283; Townsend, U.S. Pat. No. 3,136,274; and Kuhlman, U.S. Pat. No. 3,414,063, each of which disclose wheeled vehicles carrying one or a plurality of spiker elements which are vertically reciprocated to form holes in the terrain. However, in each case these prior devices utilize a complex arrangement of gears, chains, and/or pulley belts to convert the rotary motion of a motor drive into reciprocal displacement of the lawn spiker elements. In other prior art patents, such as Thom, U.S. Pat. No. 2,918,130 and Dion, U.S. Pat. No. 3,109,393, spiking elements in the form of rotary augers coupled directly to the rotary drive are utilized to drill holes in the terrain. However, due to the screwlike action of the augers, withdrawal from the ground of the spiker elements after the desired depth of penetration is reached is somewhat arduous or time consuming for, in the case of Thom, the operator must bear against the handle portion of the apparatus to lift up the screwed-in spiker elements from the soil or, in the case of Dion, the action of the motor must be reversed so as to unscrew the auger bits from the soil. Accordingly, both types of powered lawn-perforating apparatus known to the prior art, whether of the reciprocating type or the rotating auger type, contain certain material disadvantages which render them somewhat less than satisfactory for use, especially by the residential homeowner.

SUMMARY OF THE INVENTION

The present invention is directed to a powered lawn-perforating apparatus, or turf aerator as it is sometimes called, which overcomes the aforementioned disadvantages of prior art devices and which in addition contains significant safety, functional and other technical features not heretofore found. In a first embodiment, the spiker rod elements are coupled to a rotary electric motor drive carried on a wheeled frame by a simplified cam mechanism which accomplishes the requisite motion conversion to effect vertical reciprocation of the spiker rods without need for the complicated coupling means utilized in prior art devices. The cam arrangement possesses the further additional feature that the spiking elements are decoupled from the motor and held motionless until substantial resistance is asserted against the elements, as when the user exerts downward pressure at a point on the terrain where he desires holes to be punched. This permits the user to select precisely the areas where he desires the lawn to be perforated and is an important safety provision since it minimizes the likelihood of injury through accidental contact with the spiker rods.

As another important feature of the present design, the wheels and frame of the apparatus are mounted on a spring-biased suspension which materially assists in the in-and-out motion of the spiker rods as they are initially driven into the ground and thereafter withdrawn after the desired depth of penetration is reached.

It is therefore a principal objective of the present invention to provide a new and improved turf-perforator machine which is of more simplified, lightweight and compact construction than any heretofore known to the prior art.

It is an additional objective of the present invention to provide a powered lawn-perforating apparatus which is of inexpensive construction suitable for purchase and use by the homeowner and which is easier, safer and less tiring to use than prior art devices.

It is a principal feature of the lawn-perforating apparatus of the present invention to provide a spring-actuated suspension system for the wheels and frame of the vehicle so as to assist in the operation as it is rolled along the ground producing a multiplicity of holes in the terrain.

It is a further important feature to provide in a principal embodiment of the invention a cam mechanism for converting the rotary motion of a motor drive into reciprocating displacement of the spiker rod elements, said cam mechanism normally being decoupled so as to hold the spiker rods motionless except when it is desired by the user to punch holes at a precise location on the terrain.

It is a still further feature of the present invention to provide shoes underneath the frame of the vehicle to act as stops on the downward travel of the spiker elements when they have penetrated to a predetermined depth in the terrain.

The foregoing and other objectives, features and advantages of the present invention will be more readily understood upon consideration of the following detailed description of the invention, taken in conjunction with the accompanying drawings.

DESCRIPTION OF THE PREFERRED EMBODIMENTS

Figure 1:
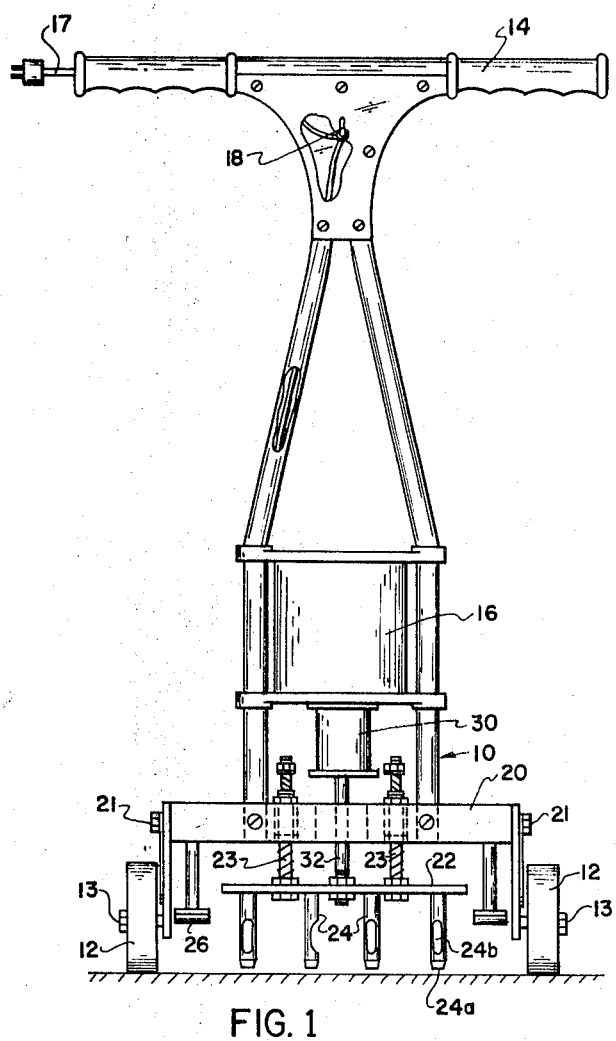
FIG. 1 is a front elevational view of a first illustrative embodiment of a lawn-perforating apparatus according to the present invention, wherein the spiker rod elements are vertically reciprocated at high frequency so as to penetrate into the turf.

Referring now to FIGS. 1-5 of the drawings, a first illustrative embodiment of the invention is depicted which comprises a vertical frame of tubular metal, designated generally as 10, supported on a pair of wheels 12 and terminating at its upward end in a horizontal handle 14 for gripping and guiding by the operator in a manner similar to a conventional lawnmower. Supported between the two spaced vertical members of the frame is an electric motor 16 which is connected by a cord 17 to a suitable source of electrical potential and energized by actuation of switch 18 mounted on the yoke portion of the handle. (Alternatively a battery-powered cordless motor or gasoline-powered motor could substitute for the prime mower shown, if desired). The output shaft 19 of the motor, which typically revolves at or near a speed of 3,600 revolutions per minute based on a powerline frequency of 60 Hertz, extends vertically downward and couples through a cam mechanism 30 to the spiker assembly 22. The cam mechanism, the details of which will hereinafter be explained, converts the rotary motion of the motor 30 into a vertical reciprocation of the spiker assembly at a frequency proportional to the speed of revolution of the motor shaft 19.

The spiker assembly is supported by a pair of spring-biased suspension rods 23 from the frame crossbar 20 and terminates in a plurality (typically four) of spiker rods 24 for punching holes in the terrain. The spring-bias on the support rods 23 maintains the tips of the spiker elements 24 at a small clearance above the surface of the ground when the spiker assembly is in the retracted or quiescent position with no downward pressure exerted by the operator on the handle 14 of the apparatus. A pair of vertically extending shoes 26 project downwardly from the crossbar 20 and serve as stops on the downward penetration of the spiker rods into the ground. The spiker rods 24 have tapered tip portions 24a and are preferably hollow and provided with a cutout portion 24b along a portion of their respective tubular walls so as to facilitate the formation of the plug of earth and its ejection automatically as successive holes are formed.

Figure 2:
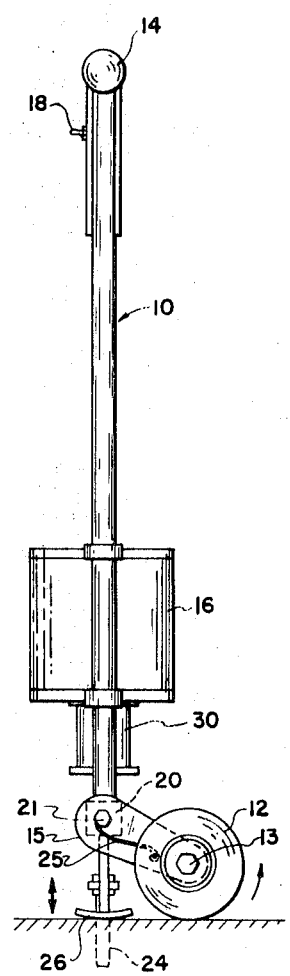
FIG. 2 is a side elevational view of the embodiment of FIG. 1 with the spiker rod elements penetrating into the terrain.
Figure 5:
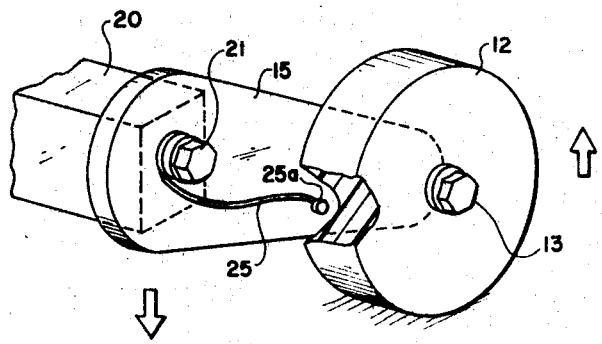
FIG. 5 is a pictorial view showing details of the spring-actuated suspension system for the wheels of the apparatus.

As is shown in FIGS. 2 and 5, wheels 12 are connected to the crossbar 20 of the frame of the apparatus by a spring suspension which permits them to flex upwardly in a vertical arc when downward pressure is exerted by the operator on the frame through its handle, so as to cause the spiker rods to penetrate into the ground. The wheels then return downwardly to support the frame as the rods are withdrawn from the holes formed in the terrain. To provide this in-and-out motion which materially assists in the operation of the spiker apparatus, each of the wheels 12 is supported for rotation on an axle assembly 13 mounted on one end of a radial arm member 15 whose other end is pivotably connected at 21 to an end termination of the frame crossbar 20. A spring element 25 fixed at 25a to the arm member 15 and attached by its other end around the pivot point 21 serves to bias the wheel 12 downward so as to assist in the withdrawal of the spiker rods upwardly from the holes just formed when downward pressure is released by the operator from the handle 14 of the apparatus.

Figure 3A:
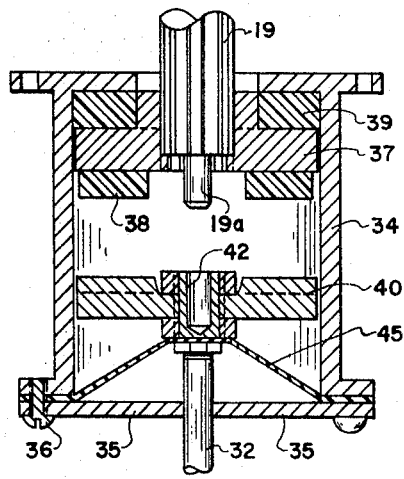
FIG. 3A is a detailed sectional view showing the construction of the cam mechanism in the embodiment of FIG. 1 for converting the rotational motion of the motor drive into reciprocating displacement of the spiker rod elements, the cam mechanism being depicted in the decoupled mode.
Figure 3B:
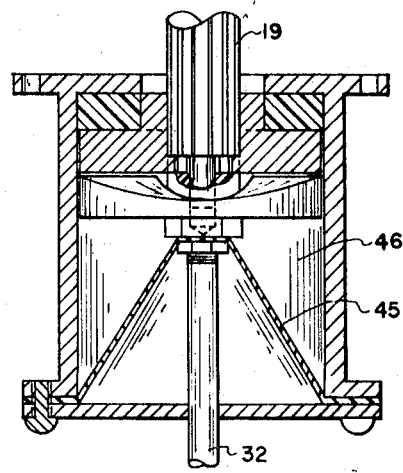
FIG. 3B is a detailed sectional view, similar to FIG. 3A, showing the cam mechanism in the coupled mode.
Figure 4:
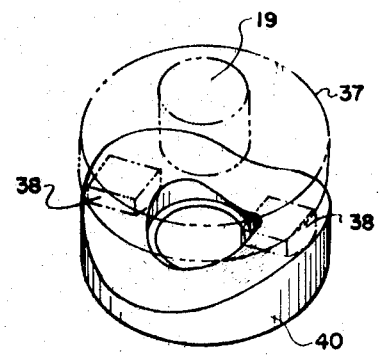
FIG. 4 is a pictorial view showing further details of the cam mechanism.

FIGS. 3A and 3B illustrate details of the construction of the cam mechanism coupling the output shaft 19 of the motor to the spiker assembly 22. The cam mechanism is contained within a cylindrical can housing 34 whose lower end is closed by an end plate 35 secured by fasteners 36. The terminal end of the motor shaft 19 fits through a central opening in the upper end of the cam housing and is connected to rotate a cam follower 37 which, as best shown in FIG. 4, is in the form of a circular disc fitting inside the cavity of the housing and provided with a pair of projecting bosses 38. The backface of the cam follower disc 37 rests against a thrust washer 39 provided at the upper end of the cam housing. The shaft 19 is preferably splined to permit longitudinal movement relative to the cam disc 37.

The mating element to the cam follower, located in the lower part of the cam housing, comprises a cam 40 which is in the form of a circular disc fastened to shaft 32 which in turn extends vertically downward through a central opening formed in the end plate of the housing through a hole in the crossbar 20 to connect to the spiker assembly 22. The upper surface of the cam disc 40 is configured to provide an undulating track for the bosses 38 of the cam follower 37 so that, with the elements in contacting engagement, rotation of the follower over the surface of the cam produces an alternating inward and outward, or reciprocating, displacement of the two elements relative to each other. The cam portion 40 is connected by a flexible conical diaphragm 45 of neoprene or similar material having a radial lip portion which fits as a gasket between the lower edge of the cam housing 34 and its end plate 35. The cavity formed between the diaphragm and the backface of the cam is preferably filled with lubricating oil 46 to smooth the operation of the cam mechanism.

In the quiescent mode of the apparatus, when no downward pressure is exerted by the operator on the handle 14, the cam follower is decoupled from its cam, as illustrated in FIG. 3A, by reason of the spring bias provided by the support rods 23. In this mode, rotation of the motor shaft 19 results in a corresponding rotation of the cam follower 37 but since it is separated from its mating element there is no transmission of power to the spiker elements 24. When the operator desires to punch holes in the terrain at a desired location, he exerts a downward pressure on the handle 14 which overcomes the bias provided by the spring suspension system and brings the tips of the spiker elements 24 into contact with the ground. The resulting upward pressure on the spiker rod elements forces the assembly 22 upwardly against the frame crossbar 20, thus producing an upward displacement of the camshaft 32 so as to bring the cam disc 40 into contact with its mating portion 37—a condition illustrated in FIG. 3B. A pilot hole 42 is preferably provided in the center of the cam 40 to guide the tip extension 19a of the motor shaft as the two cam parts are brought together.

In the coupled mode the rotary torque of the motor shaft 19 is exerted against the face of the undulating cam surface 40 with the result that an oscillatory or reciprocating motion is imparted to the camshaft 32. (For the cam configuration shown, where there are two complete undulations for a complete revolution of the cam surface, the frequency of reciprocation is twice that of the motor speed.) The rapid oscillatory action imparted by the cam mechanism to the spiker assembly causes the rod elements 24 to quickly and readily penetrate into the terrain to the desired predetermined depth as determined by the setting of the shoe stops 26.

When the desired depth of penetration is reached, the operator merely releases his downward pressure on the handle 14 which permits the spring-bias suspension on the support rods 23 to elevate the frame 10 above the spiker assembly thereby separating the cam elements 37 and 40 and uncoupling the spiker assembly from the motor drive. The spring action provided by the wheel suspension then assists the operator in withdrawing the spiker rods from the holes thus formed in the ground.

Figure 8:
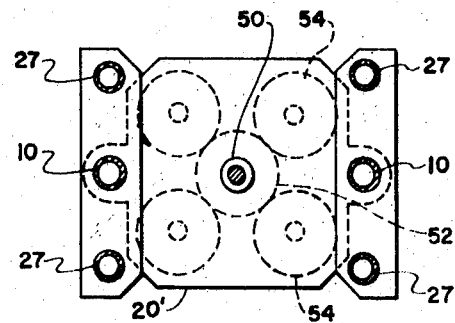
FIG. 8 is a top sectional view taken along the line 8—8 in FIG. 6.
Figure 6:
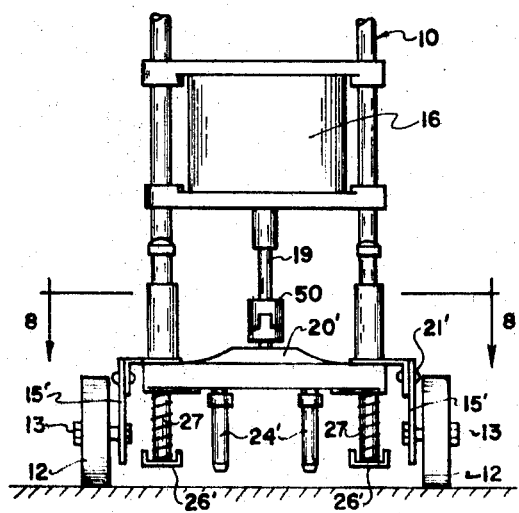
FIG. 6 is a fragmentary front elevational view showing a modified embodiment of the lawn-perforating apparatus of the present invention wherein the lawn spiker elements are in the form of rotating augers which drill into the terrain.
Figure 7:
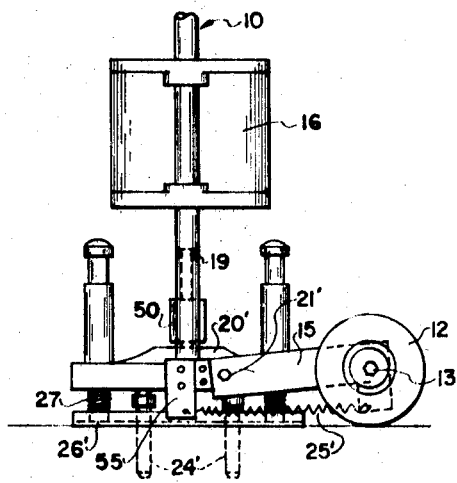
FIG. 7 is a fragmentary vertical elevational view of the modification of FIG. 6 showing the spiker elements penetrating into the terrain.

FIGS. 6-8 show a modified embodiment of the invention, in which similar reference numerals refer to like elements in the two respective embodiments, utilizing spiker elements in the form of rotary augers 24' which drill into the terrain. In this embodiment the output shaft 19 of the motor 16 which is supported on the vertical frame 10 of the apparatus is directly connected by a coupling 50 to a drive gear 52 carried inside the crossbar frame plate 20'. The drive gear intermeshes with a plurality (typically four) driven gears 54 each fastened respectively to an associated drill bit 24' so that all of the rotary spiker elements are commonly driven from the same motor shaft.

In a manner similar to that of the previously described embodiment, the frame of the apparatus is carried on a pair of spring-suspended wheels 12. In this embodiment the spring suspension for each wheel comprises a spring element 25' fixed at one end to the crossbar frame 20' by means of a link 55 and secured at the other end near to the distal end of the pivotable radial arm member 15' on which the wheel is rotatably mounted. The wheel assembly flexes upward when downward pressure is exerted on the handle of the apparatus to permit the spiker elements 24' to contact and drill into the terrain. Shoes 26' project downwardly beneath the crossbar frame 20' and are carried on respective pairs of spring-biased rods 27. As the drill bits 24' penetrate into the earth, increasing resistance against downward movement of the frame is created until the point where the compression of the spring suspension reaches the limit, shown in FIG. 7, corresponding to the penetration of the spiker elements 24' to a predetermined depth. When downward pressure on the handlebar is released by the operator, the combination of the spring action of the wheel assembly acting in conjunction with the spring bias on the shoe elements 26' together assist in the ready removal of the spiker bits from the soil and the elevation of the frame support shoes 26' above the point of contact of the wheels to the ground so as to render the apparatus ready for rolling to the next location where aeration of the terrain is desired.

As will be readily recognized, the spring action provided on the frame of the apparatus both in this and in the previous embodiment permits rapid and easy withdrawal of the spiker elements after the desired depth of penetration is reached and accordingly greatly minimizes the effort of the operator. The user need merely stop the apparatus at a point on the terrain where he desires holes to be punched and bear down on the handlebar portion 14. As soon as he releases this pressure the spiker elements withdraw fully from the holes, the wheels move back into a supporting position underneath the frame of the apparatus, and the device is then ready for rolling transport to the next site.

The terms and expressions which have been employed in the foregoing abstract and specification are used therein as terms of description and not of limitation, and there is no intention, in use of such terms and expressions, of excluding equivalents of the features shown and described, or portions thereof, it being recognized that the scope of the invention is defined and limited only by the claims which follow.

What is claimed is:

1. Lawn-aerating apparatus of the type for punching a multiplicity of holes in terrain comprising: a vertical frame; a handlebar attached to said frame for guiding the travel of said apparatus; wheel means connected to and providing rolling transport of said frame; a spiker assembly connected to the lower extremity of said frame and having downwardly projecting spiker rods; and a motor carried on said frame and operatively coupled to said spiker assembly, characterized in that said wheel means comprise a pair of wheels each rotatably mounted on a respective spring-biased radial arm member which is pivotably connected to the corresponding side of said frame, said spring bias serving to maintain said wheels in a downwardly extended, supporting position beneath said frame elevating the lower tips of said spiker rods above the terrain, whereby the application of a downward force of predetermined magnitude on said handlebar is transmitted through said frame to overcome said spring bias on said radial arm members to cause said wheels to flex upward relative to said frame, thereby bringing said spiker rods into contact with the terrain.

2. Lawn-aerating apparatus of the type for punching a multiplicity of holes in terrain comprising a vertical frame; a handlebar attached to said frame for guiding the travel of said apparatus; wheel means connected to and providing rolling transport of said frame; a spiker assembly connnected to the lower extremity of said frame and having downwardly projecting spiker rods; a motor carried on said frame; and a motion translation means for converting the rotary output of said motor into a reciprocating vertical displacement of said spiker rods, characterized in that said motion translation means comprises a pair of mating members forming a cam assembly, one of said members being connected to the output shaft of said motor for rotation thereby and the other of said members being connected to said spiker assembly for axial movement therewith, and a spring suspension means coupled to said other member of said motion translation means and to said frame, said spring suspension axially biasing said other member so as to operatively disengage said motion translation means and maintain said spiker assembly decoupled from said motor until said bias of said spring suspension is overcome by the application of a downwardly directed force of predetermined magnitude to said frame through said handlebar.

3. The lawn-aerating apparatus of claim 2 wherein said pair of mating members forming said cam assembly are in the form of horizontally disposed discs, with one of said cam discs having a projecting boss portion slideably contacting the face of the other cam disc when said predetermined downwardly directed force is applied to said frame through said handlebar, and the other of said cam discs has an undulating circular track formed on its face, thereby imparting a reciprocating axial movement of said cam discs relative to each other when said cam assembly is drivingly engaged to said motor.

4. The lawn-aerating apparatus of claim 3 wherein said cam elements are enclosed within a cylindrical housing containing a supply of lubricating fluid therein.

5. The lawn-aerating apparatus of claim 2 further characterized in that said wheel means comprise a pair of wheels each rotatably mounted on a respective spring-biased radial arm member which is pivotally connected to a corresponding side of said frame, said last-mentioned spring bias serving to maintain said wheels in a downwardly extended, supporting position beneath said frame elevating the lower tips of said spiker rods above the terrain, whereby the application of said downward force of predetermined magnitude on said handlebar overcomes the first-mentioned spring bias on said spring suspension connecting said motion translation means to said frame so as to operatively couple said motor to said spiker assembly and also overcomes said spring bias on said radial arm members bearing said wheels so as to cause said wheels to flex upward relative to said frame, thereby bringing said spiker rods into contact with the terrain.

6. The lawn-aerating apparatus of claim 2 wherein the output shaft of said motor, said motion translation means and said spiker assembly are mounted on said frame arranged in a vertical, substantially in-line coaxial relationship.

* * * * *